219-121 SR

7/31/84 OR 4,463,245

United States Patent [19]

McNeil

[11] Patent Number: 4,463,245

[45] Date of Patent: Jul. 31, 1984

[54] PLASMA CUTTING AND WELDING TORCHES WITH IMPROVED NOZZLE ELECTRODE COOLING

[75] Inventor: John McNeil, Blackwood, Scotland

[73] Assignee: Weldtronic Limited, Scotland

[21] Appl. No.: 391,009

[22] Filed: Jun. 23, 1982

[30] Foreign Application Priority Data

Nov. 27, 1981 [GB] United Kingdom ................. 8135838

[51] Int. Cl.[3] ................................................. B23K 9/00

[52] U.S. Cl. ...................... 219/121 PM; 219/121 PN; 219/121 PQ; 239/132; 239/132.3; 313/231.31

[58] Field of Search ................. 219/121 PM, 121 PN, 219/121 PP, 121 PQ, 74, 75, 76.11, 76.16, 120, 121 P, 121 PA; 239/128, 132, 132.3, 132.1, 131; 313/231.3-231.6

[56] References Cited

U.S. PATENT DOCUMENTS

| | | | |
|---|---|---|---|
| 3,794,806 | 2/1974 | Klasson | 219/121 PN |
| 3,830,428 | 8/1974 | Dyos | 219/121 PN |
| 4,024,373 | 5/1977 | Bykhovsky et al. | 219/121 PN |
| 4,354,088 | 10/1982 | Rehrig | 219/121 PM |

FOREIGN PATENT DOCUMENTS

| | | | |
|---|---|---|---|
| 0558617 | 3/1980 | U.S.S.R. | 219/121 PN |

*Primary Examiner*—M. H. Paschall

*Attorney, Agent, or Firm*—Arnold, White & Durkee

[57] ABSTRACT

A plasma torch (40) comprises a handle (41) having an upper end (41B) which houses the components forming a torch body (43). Body (33) incorporates a rod electrode (10) having an end which cooperates with an annular tip electrode (13) to form a spark gap. An ionizable fuel gas is fed to the spark gap via tube (44) within the handle (41), the gas from tube (44) flowing axially along rod electrode (10) and being diverted radially through apertures (16) so as to impinge upon and act as a coolant for a thin-walled portion (14) of the annular tip electrode (13). With this arrangement the heat generated by the electrical arc in the inter-electrode gap is substantially confined to the annular tip portion (13A) of electrode (13) which is both consumable and replaceable in that portion (13A) is secured by screw threads to the adjoining portion (13B) of electrode (13) and which is integral with the thin-walled portion (14).

1 Claim, 7 Drawing Figures

PLASMA CUTTING AND WELDING TORCHES WITH IMPROVED NOZZLE ELECTRODE COOLING

This invention relates to plasma cutting and welding torches.

Plasma cutting and welding torches are well known and comprise a torch body mounted on a handle and containing a first electrode in the form of a rod which at one end adjoins a second electrode in the form of an apertured torch tip and an ionisable gas is fed under pressure through the body into contact with the two electrodes resulting in a pilot electrical arc being struck between the two electrodes. When the torch is brought into proximity with a workpiece at a similar potential or polarity to that of the apertured torch tip the electrical arc is transferred via the ionised gas stream issuing from the apertured torch tip to the workpiece. The resulting plasma effects cutting or welding as determined by an operator who utilises the torch as a hand tool.

It is an object of the present invention to provide a plasma cutting and welding torch incorporating a cooling means whereby the heat generated by electrical arcing is prevented from reaching the torch handle.

According to the present invention there is provided a plasma torch comprising a body mounted on a handle, the body having a through aperture housing a rod electrode which protrudes at one end from the aperture and is releasably clamped to said body by clamp means operated by a clamp actuator at the other end of said aperture, a tubular electrode assembly mounted externally of said body and comprising a consumable electrode nozzle releasably secured to an electrode collar, the latter being releasably secured to the body at said one aperture end and having a thin-walled annular waist portion the arrangement being such that the rod electrode extends substantially coaxially within the tubular electrode assembly and forms an electrode gap with the electrode nozzle, and conduit means are provided through the torch body for directing a supply of ionisable gas under pressure into the electrode gap so as to provide, in use, a plasma stream emergent from the electrode nozzle as a consequence of the inter-electrode electrical arc struck in the electrode gap in the presence of the ionisable gas, and wherein said conduit means comprises an annular pathway surrounding the rod electrode and terminating within the electrode collar of the tubular electrode assembly in generally radially directed apertures whereby the gas is directed to impinge on the thin walled annular waist portion of said collar to produce a cooling effect thereon prior to the gas reaching the electrode gap so that, in use, the heat generated by the electrical arc is substantially confined to the consumable electrode nozzle which is replaceable and the torch body remains substantially thermally isolated therefrom.

By virtue of the present invention the heat generated by the pilot arc at the torch tip is relatively isolated from the torch body and therefore the torch handle by virtue of the cooling effected on the thin-walled portion of the tip. By way of example the thin-walled portion may be about 0.5 mm in wall thickness and about 10 mm in axial extent, whilst the axial extent of the tubular electrode assembly is about 25 mm, i.e. the thin-walled portion constitutes about 40% of the axial extent of the tubular electrode assembly. If so desired the exterior surface of the thin-walled portion of the tip may be provided with heat-dissipating fins or other heat-dissipating arrangement such as water cooling.

It will also be noted that the present invention utilises the ionisable gas which constitutes the fuel gas of the torch to effect the cooling action and does not rely upon a subsidiary gas for this effect.

Embodiments of the present invention will now be described by way of example with reference to the accompanying drawings, in which.

Figure 1:
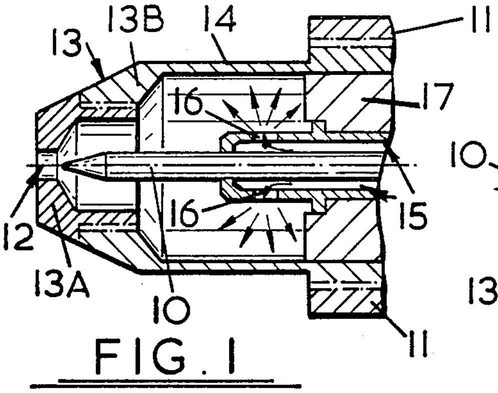
FIG. 1 illustrates part of a plasma torch.

As shown in FIG. 1, a rod electrode 10 is secured to a torch body 11 such that the free end of electrode 10 adjoins the aperture 12 of a tip electrode 13. Electrode 13 is formed in two parts 13A, 13B screw-threaded together, part 13B incorporating a thin-walled portion 14 adjacent the junction of electrode 13 with the body 11. Ionisable gas is fed along an annular pathway 15 in body 11 co-axially with rod electrode 10 and is forced in a generally radial direction through holes 16 in the sleeving defining the pathway 15 so that the gas impinges upon the interior surface of the thin-walled portion 14 of tip electrode 13 prior to the gas contacting the two electrodes 10, 13 and issuing from aperture 12 as an ionised stream as a consequence of the electrical pilot arc struck between the two electrodes within the torch. On emerging from holes 16 the gas is prevented from flowing away from aperture 12 by an insulator 17 fitted to the torch body 11.

Figure 2:
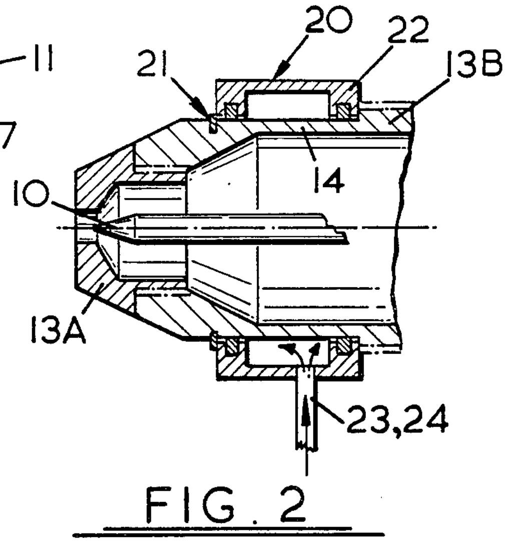
FIGS. 2 and 3 illustrate alternative modifications to the torch part of FIG. 1.

In the modification illustrated in FIG. 2 all the details of FIG. 1 are present but not shown in the interests of simplicity and additionally a heat-dissipating water jacket 20 is fitted to the exterior surface of portion 14. Jacket 20 is secured by a circlip or other fastener 21 and is sealed by conventional O-rings 22. Water is delivered to and removed from jacket 20 by pipes 23, 24 (only one of which is shown). Conveniently jacket 20 is rotatable about the portion 14 so that the orientation of pipes 23, 24 is as desired. Instead of jacket 20 being supplied by water as the cooling medium a gas could be used. Conveniently the gas is the fuel gas of the torch prior to its delivery to annular pathway 15 in which case the fuel gas acts as a coolant for both interior and exterior surfaces of the thin-walled portion 14. As an alternative to the FIG. 2 modification the exterior surface of portion 14 could be provided with protrusions or fins to provide additional heat dissipation. Of course similar fins could also be provided on the interior surface of portion 14.

Figure 3:
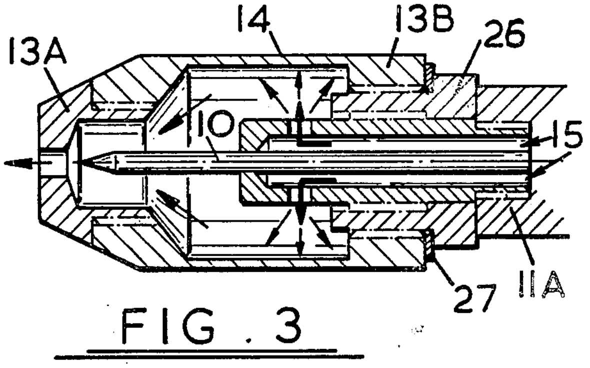

In the modification illustrated in FIG. 3 the FIG. 1 components 13, 14 are fitted to a standard T.I.G. welding torch body 11A by means of a ceramic adaptor 26 interposed between the tip electrode 13 and the body 11A thereby allowing the welding torch to perform plasma cutting. In this case a separate electrical connection 27 requires to be provided for the tip electrode 13 and will in turn be connected via a resistor or capacitor to the workpiece. It will be understood that the FIG. 2 modification can be applied to the FIG. 3 arrangement.

Figure 4:
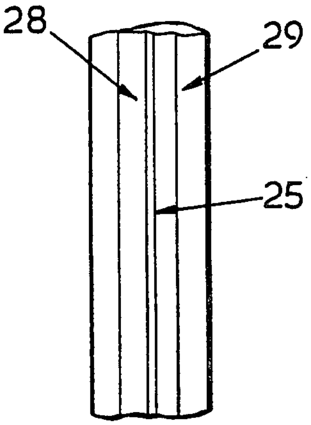
FIG. 4 illustrates a current-limiting resistor device.

The plasma torch of the present invention requires to be fed from a gas and electrical power control system and conventionally such control systems have utilised large resistor elements to limit the pilot arc current. This resistor is bulky and easily damaged and conventionally fed by an electrical cable connected to the workpiece (positive potential). In a preferred arrangement this resistor 25 extends substantially the whole length of the cable and is encapsulated as shown in FIG. 4 in a silicon rubber or ptfe sleeve 28. As is known silicon rubber and ptfe are resistant to high temperatures and other high temperature media such as oil, grease, water could be used to house the resistor in an electrically safe manner. Sleeve 28 is itself encased in a protective sheath 29. Alternatively the system illustrated in FIG. 5 could be used in which case the resistor is replaced by a capacitive filter network 25A, for example a simple d.c. blocking capacitor of value around 300 ρF. Such an arrangement prevents continuous arcing between the electrodes at the initial gas ionisation stage thereby reducing the heat generated at the electrodes. The open circuit voltage using either the resistor or capacitor arrangement can be as low as 70 volts which permits the torch to be operated from standard Welding Power Sources and H.F. Generators and the electrical safety of the torch is enhanced.

Figures 6, 7:
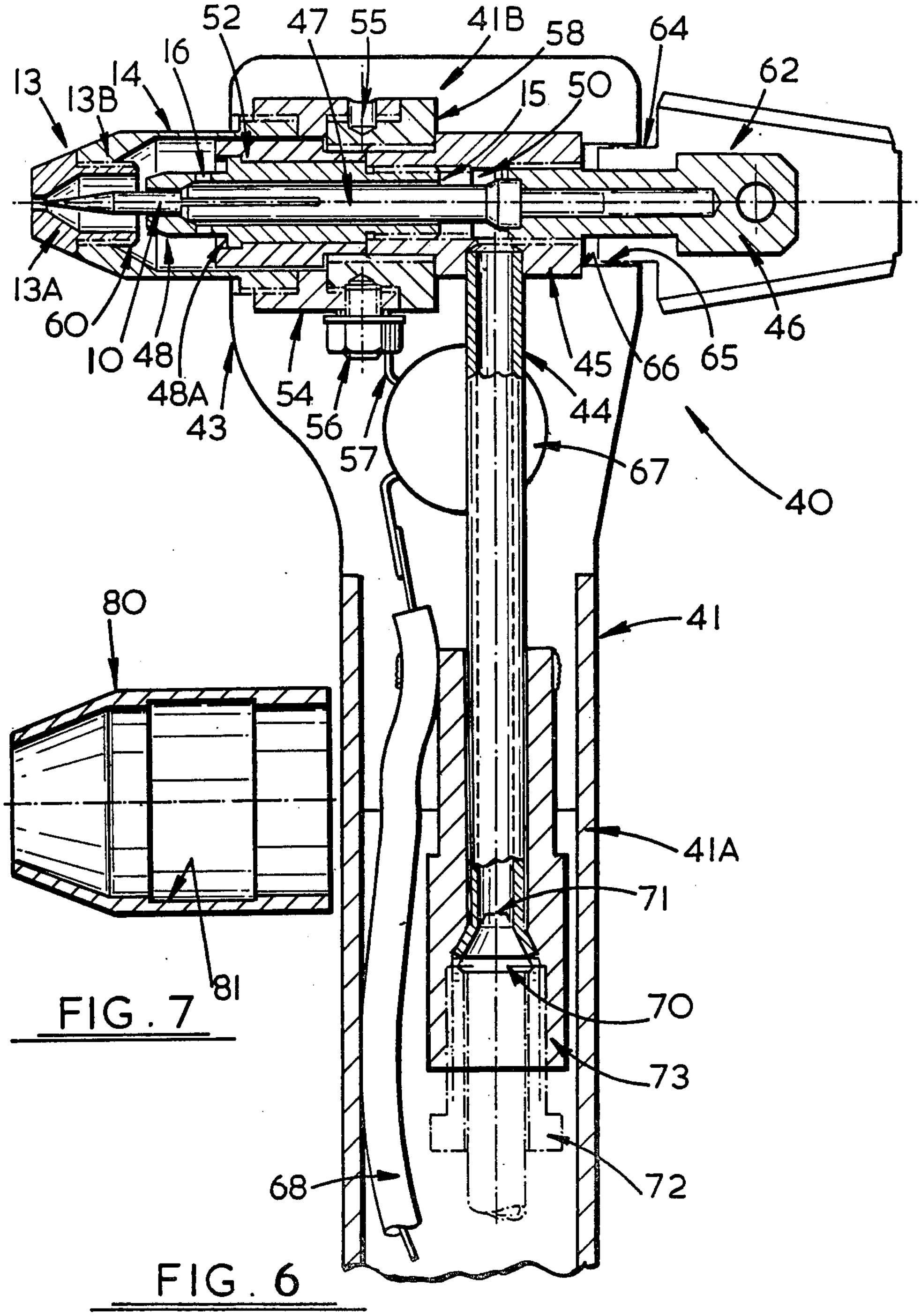
FIG. 6 illustrates a plasma torch according to the present invention in greater detail.
FIG. 7 illustrates a component which may be fitted to the torch of FIG. 6 if so desired.

FIG. 6 illustrates a plasma torch 40 in accordance with the present invention in greater detail. Torch 40 comprises a handle 41 having a lower end 41A which is hollow to receive the gas and electrical connections as will be explained. The upper end 41B of handle 41 is moulded and houses the components forming the torch body 43. These components comprise electrically conductive tube 44 the upper end of which is secured by welding or braising to sleeve 45. Sleeve 45 is internally threaded and at the right hand end illustrated in FIG. 6 acts as a mounting for a screwed back cap 46 which accommodates the non-working end of rod electrode 10 and abuts one end of sleeve 47 coaxially surrounding electrode 10 the other end of which sleeve is axially split and when axially biassed by end cap 46 is caused to move radially inwardly so as to clamp the working end of rod electrode 10. This is effected by cooperating conical surfaces on sleeve 47 and on a further sleeve member 48 which extends from and is secured by means of screw threads to sleeve 45. Sleeve member 48 and sleeve 47 define the annular pathway 15 and the holes 16 are formed in the member 48. The pathway 15 extends between holes 16 and a chamber 50 formed in the sleeve 45 into which tube 44 leads.

Sleeve member 48 is provided with an annular shoulder 48A which holds an electrical insulator 52 to separate sleeve member 48 which is at one electrical potential from the tip electrode 13 which is at the other electrical potential and which is connected by screw threads to member 54 moulded into handle upper end 41B, member 54 being provided with a plurality of threaded holes 55 of which an appropriate one accommodates bolt 56 which acts to secure electrical conductor 57 to member 54. Member 54 in turn is separated from sleeve 45 by electrical insulator 58.

The tip electrode 13 as previously explained is formed in two parts, namely 13A, 13B, which are screw threaded together at 60. Part 13A is consumable and requires intermittent replacement and to enhance the cooling effect of the fuel gas on the thin-walled portion 14 of part 13B the threaded stem of portion 13A is axially oversize so as to provide a baffle effect.

Back cap 46 is partially moulded into component 62 the outer surface of which has ribbing or knurling to facilitate manual screw threading of back cap 46 into sleeve 45. Additionally component 62 is provided with a spigot 64 containing an annular rib portion 65 which is a tight fit in aperture 66 of handle top part 41B so as to act as a gas seal since there is a tendency for gas exiting from chamber 50 via the threads interconnecting sleeve 45 with back cap 46 and of course this is undesirable.

Figure 5:
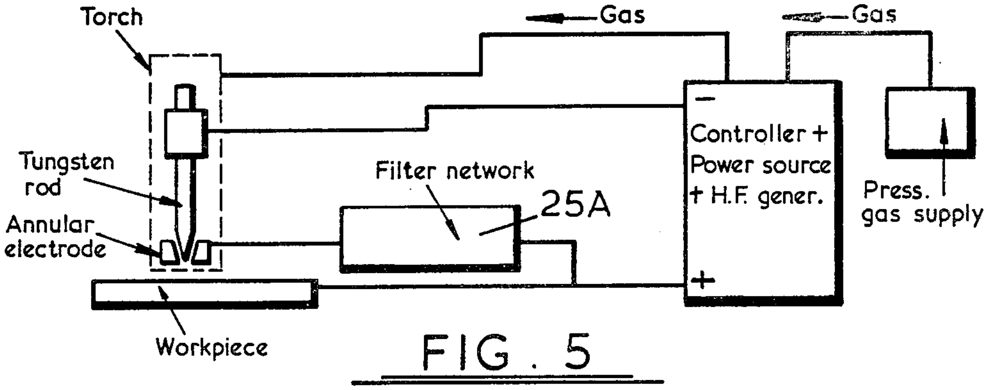
FIG. 5 illustrates a plasma torch forming part of a complete system.

Electrical conductor 57 in this embodiment is connected to capacitor 67 to conform with the FIG. 5 system arrangement and capacitor 67 is fed by cable 68 extending along handle 41 and being connected at its remote end to the positive terminal of the electrical power source. The negative electrical supply is connected within handle 41 to the lower end of tube 44 by means of a conical termination 70 illustrated in phantom in FIG. 6. This termination 70 is apertured at end 71 to permit the fuel gas to pass along the interior of tube 44, the gas being supplied to termination 70 by means of a side orifice (not shown). Termination 70 is located by a threaded member 72 which is secured to insulator 73 surrounding the tube 44 and moulded into handle upper end 41B.

It will be understood that the electrically conductive components of torch 40 are made of such materials as copper, brass or bronze according to their thermal duty cycle. The moulded components are preferably made of silicon rubber.

In order to enhance the electrical safety of the torch 40 the tip electrode 13 may be encased in a close-fitting ceramic housing 80 illustrated in FIG. 7. Housing 80 is simply a push fit over electrode 13 which is preferably made of stainless steel, and is retained by a corrugated clamp ring (not shown) located in the annular recess 81 within the bore of housing 80. The clamp ring may conveniently be made of thin stainless steel in order to minimise thermal conduction therethrough.

What is claimed is:

1. A plasma torch comprising a body mounted on a handle, the body having a through aperture housing a rod electrode which protrudes at one end from the aperture and is releasably clamped to said body by clamp means operated by a clamp actuator at the other end of said aperture, a tubular electrode assembly mounted externally of said body and comprising a consumable electrode nozzle releasably secured to an electrode collar, the latter being releasably secured to the body at said one aperture end and having a thin-walled annular waist portion the arrangement being such that the rod electrode extends substantially co-axially within the tubular electrode assembly and forms an electrode gap with the electrode nozzle,
   - and conduit means are provided through the torch body for directing a supply of ionisable gas under pressure into the electrode gap so as to provide, in use, a plasma stream emergent from the electrode nozzle as a consequence of the inter-electrode electrical arc struck between the rod electrode and the nozzle electrode in the electrode gap in the presence of the ionisable gas,
   - and wherein said conduit means comprises an annular pathway surrounding the rod electrode and terminating within the electrode collar of the tubular electrode assembly in generally radially directed apertures whereby the gas is directed to impinge on the thin walled annular waist portion of said collar to produce a cooling effect thereon prior to the gas reaching the electrode gap so that, in use, the heat generated by the electrical arc is substantially confined to the consumable electrode nozzle which is replaceable and the torch body remains substantially thermally isolated therefrom.

* * * * *